(12) United States Patent
Griego et al.

(10) Patent No.: US 11,629,036 B2
(45) Date of Patent: Apr. 18, 2023

(54) OUTRIGGER PAD HOIST APPARATUS

(71) Applicant: TNT Crane & Rigging, Inc., Houston, TX (US)

(72) Inventors: Albert Griego, Denver, CO (US); Sam Romero, Denver, CO (US)

(73) Assignee: TNT Crane & Rigging, Inc., Houston, TX (US)

( * ) Notice: Subject to any disclaimer, the term of this patent is extended or adjusted under 35 U.S.C. 154(b) by 0 days.

(21) Appl. No.: 17/752,232

(22) Filed: May 24, 2022

(65) Prior Publication Data

US 2022/0281723 A1 Sep. 8, 2022

Related U.S. Application Data

(62) Division of application No. 16/412,001, filed on May 14, 2019, now Pat. No. 11,414,307.

(60) Provisional application No. 62/671,399, filed on May 14, 2018.

(51) Int. Cl.
  *B66C 23/78* (2006.01)
  *B60R 9/06* (2006.01)
  *B66C 23/38* (2006.01)

(52) U.S. Cl.
  CPC ............. *B66C 23/78* (2013.01); *B60R 9/06* (2013.01); *B66C 23/38* (2013.01)

(58) Field of Classification Search
  CPC . B66C 23/78; B66C 23/38; B60R 9/06; B60P 1/4428; B60P 1/4485
  USPC ........................................ 248/673, 674, 677
  See application file for complete search history.

(56) References Cited

U.S. PATENT DOCUMENTS

| | | | |
|---|---|---|---|
| 4,039,206 A | 8/1977 | Nault | |
| 5,387,071 A * | 2/1995 | Pinkston | B60P 3/28 280/765.1 |
| 5,706,960 A * | 1/1998 | Pitman | B66C 23/80 280/764.1 |
| 6,092,975 A | 7/2000 | Cannon, Jr. et al. | |
| 6,769,858 B1 | 8/2004 | Butler et al. | |
| 7,114,736 B2 | 10/2006 | Stodola et al. | |
| 7,419,185 B2 | 9/2008 | Richard | |
| 8,424,886 B2 | 4/2013 | Mozo | |
| 9,038,835 B2 | 5/2015 | Oliver et al. | |
| 9,222,306 B2 | 12/2015 | Appling et al. | |
| 9,550,475 B1 | 1/2017 | Walker et al. | |
| 11,091,081 B1 * | 8/2021 | Romero | B66C 23/62 |
| 2005/0079037 A1 | 4/2005 | Boyd | |

(Continued)

*Primary Examiner* — Christopher Garft
*Assistant Examiner* — Michael McDuffie
(74) *Attorney, Agent, or Firm* — Bracewell LLP; Constance G. Rhebergen; Brian H. Tompkins

(57) ABSTRACT

Provided is an outrigger pad hoist apparatus that raises and lowers outrigger pads on a mobile crane. The outrigger pad hoist apparatus includes a frame having two arms that form an angle such that frame conforms and may be coupled to a rear end of an elevated deck of a mobile crane system. The outrigger pad hoist apparatus includes a winch mechanism, a chain, and an outrigger pad holder coupled to the chain. The outrigger pad holder moves along the frame via movement of the chain by the winch mechanism. Outrigger pads may be placed on the outrigger pad holder. The outrigger pads may be moved to a lower position for easier removal by operating the winch mechanism. Mobile cranes having the outrigger pad hoist and methods of operation and manufacture are also provided.

4 Claims, 4 Drawing Sheets

(56) References Cited

U.S. PATENT DOCUMENTS

| | | |
|---|---|---|
| 2006/0037666 A1 | 2/2006 | Smith |
| 2012/0183369 A1 | 7/2012 | Landoll et al. |
| 2015/0190265 A1 | 7/2015 | Kreuzer et al. |
| 2017/0114562 A1 | 4/2017 | Oesch et al. |
| 2019/0345012 A1 | 11/2019 | Griego et al. |

\* cited by examiner

OUTRIGGER PAD HOIST APPARATUS

CROSS-REFERENCE TO RELATED APPLICATIONS

This application is a divisional of and claims priority from U.S. Non-provisional Application Ser. No. 16/412,001 filed May 14, 2019, and titled "OUTRIGGER PAD HOIST APPARATUS, which claims priority from U.S. Provisional Application No. 62/671,399 filed May 14, 2018, and titled "OUTRIGGER PAD HOIST APPARATUS," each of which are incorporated by reference in their entirety for purposes of United States patent practice.

BACKGROUND

Field of the Disclosure

The present disclosure generally relates to mobile cranes. More specifically, embodiments of the disclosure relate to an outrigger pad hoist apparatus for mobile cranes.

Description of the Related Art

Mobile cranes are often designed to operate both as cranes for lifting loads and as vehicles capable of moving in normal road traffic. These mobile cranes generally include an undercarriage supporting a driver's cabin at a forward end from which a driver operates a steering wheel, turn signals, and the normal implements for operating a vehicle in traffic. Behind the driver's cabin, an upper carriage is often rotatably mounted on a deck of the undercarriage. The upper carriage generally includes a boom that can be lifted and lowered, various winches and hoisting cables, and an operator's cabin from which an operator controls the boom, winches, and other components of the crane.

A mobile crane may include outriggers that improve stability of the mobile crane when the mobile crane is stationary. During operation, the outriggers may be extended from the mobile crane and may contact the ground adjacent to the mobile crane. An outrigger may exert substantial force on the ground when the crane is operated, such as when a heavy load is maneuvered using the crane. In some instances, a pad (referred to as an "outrigger pad") may be placed between the base of an outrigger and the ground. Outrigger pads may reduce the pressure placed on the ground by increasing the contact area between the outrigger and the ground. The storage and use of outrigger pads on mobile cranes, especially smaller mobile cranes, may be difficult, time-consuming, and may require significant physical exertion by an operator.

SUMMARY

Embodiments of the disclosure include an outrigger pad hoist apparatus that enables the storage and removal of outrigger pads from a mobile crane.

In one embodiment, an apparatus for storage and removal of outrigger pads on a mobile crane is provided. The apparatus includes a frame having a first arm and a second arm, the first arm and second arm forming an angle in the range of 80° to 90°, such that the frame is configured to couple to an elevated deck of the mobile crane. The apparatus further includes a winch mechanism coupled to the frame, a chain extending along the frame such that a first portion of the chain is moved in a first direction and a second portion of the chain is moved in a second direction opposite the first direction via the winch mechanism, and an outrigger pad holder coupled to the chain and moveable along the frame between a first position and a second position via movement of the chain. The outrigger pad holder is configured to receive a plurality of outrigger pads.

In another embodiment, a mobile crane is provided that includes an undercarriage supportable on a ground surface and defining an elevated deck with respect to the ground surface and a plurality of outriggers operatively coupled to the undercarriage to raise and lower the undercarriage in a vertical direction relative to the ground surface. The mobile crane also includes an outrigger pad hoist apparatus coupled to the mobile crane. The outrigger pad hoist apparatus includes a frame having a first arm and a second arm, the first arm and second arm forming an angle in the range of 80° to 90°, such that the frame is coupled an elevated deck of the mobile crane. The apparatus further includes a winch mechanism coupled to the frame, a chain extending along the frame such that a first portion of the chain is moved in a first direction and a second portion of the chain is moved in a second direction opposite the first direction via the winch mechanism, and an outrigger pad holder coupled to the chain and moveable along the frame between a first position and a second position via movement of the chain. The outrigger pad holder is configured to receive a plurality of outrigger pads.

A method is provided that includes operating an outrigger pad hoist apparatus to move a plurality of outrigger pads from a first position to second position, the first position located atop a horizontal surface of an elevated deck of a mobile crane and the second position is located behind a vertical surface of the elevated deck of the mobile crane. The outrigger pad hoist apparatus includes a frame having a first arm and a second arm, the first arm and second arm forming an angle in the range of 80° to 90°, such that the frame is coupled to the elevated deck of the mobile crane. The apparatus further includes a winch mechanism coupled to the frame, a chain extending along the frame such that a first portion of the chain is moved in a first direction and a second portion of the chain is moved in a second direction opposite the first direction via the winch mechanism, and an outrigger pad holder coupled to the chain and moveable along the frame between the first position and the second position via movement of the chain. The outrigger pad holder is configured to receive the plurality of outrigger pads. In some embodiments, the outrigger pad holder includes a tube extending from a base, the tube configured to insert through a respective plurality of holes formed in the plurality of outrigger pads. In some embodiments, the method includes removing one of the plurality of outrigger pads from the outrigger pad holder when the plurality of outrigger pads are in the second position.

In another embodiment, a method of manufacturing is provided that includes forming a frame having a first arm and a second arm, the first arm and second arm forming an angle in the range of 80° to 90°, such that the frame is configured to couple to a rear end of an elevated deck of the mobile crane. The method further includes coupling a winch mechanism coupled to the frame, placing a chain extending along the frame such that a first portion of the chain is moved in a first direction and a second portion of the chain is moved in a second direction opposite the first direction via the winch mechanism, and coupling an outrigger pad holder to the chain and moveable along the frame between a first position and a second position via movement of the chain, the outrigger pad holder configured to receive a plurality of outrigger pads.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Figure 1:
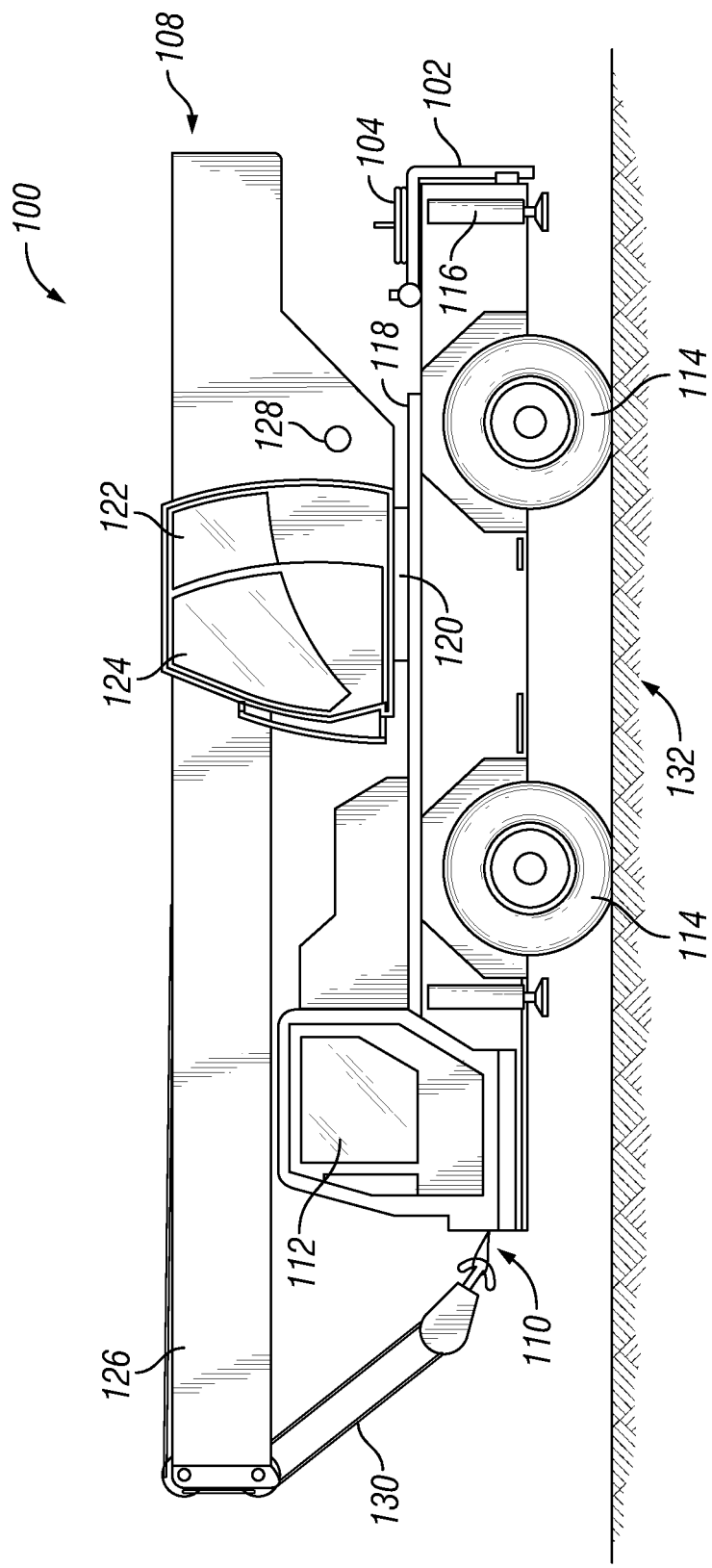
FIG. 1 is a side view of a mobile crane including an outrigger pad hoist apparatus coupled thereto in accordance with an embodiment of the present disclosure.

FIG. 1 depicts a side view of a mobile crane 100 having an outrigger pad hoist apparatus 102 in accordance with an embodiment of the disclosure. As described herein, the outrigger pad hoist apparatus 102 may hoist outrigger pads 104 onto an elevated deck of the mobile crane 100 for storage and transportation yet enable easy access to the outrigger pads 104 for use. The outrigger pad hoist apparatus 102 may lower the outrigger pads 104 from the elevated deck of the mobile crane for easy removal and use by an operator in accordance with an example embodiment of the disclosure as described in greater detail below.

The mobile crane 100 includes an undercarriage 106 and an upper carriage 108. The undercarriage 106 includes a vehicle base 110 having a driver's cabin 112 at a forward end thereof, from which the mobile crane 100 is operated in road traffic. Vehicle tires 114 support the mobile crane 100 in traffic, while outriggers 116 are provided on laterally outward sides of the undercarriage 106 for supporting the crane 100 when operated as a crane to lift loads. The vehicle base 110 defines a deck 118 that is a generally flat platform that supports the upper carriage 108.

The upper carriage 108 is arranged on a rotatable turret 120 on the deck 118 that permits the upper carriage 108 to rotate 360 degrees. An operator's cabin 122 includes a door 124, and is positioned on the turret 120. A telescoping boom 126 is pivotally mounted about a pivot axis 128, about which the boom 126 is selectively raised and lowered. A hoist cable 130 is supported by the telescoping boom 126 and is operatively associated with a winch mechanism or other mechanism for lifting loads.

The outriggers 116 may be controlled from the operator's cabin 122 or from a control panel located on the mobile crane 100. As will be appreciated, the outriggers 116 may be extended outward from the mobile crane 100 and downward towards the ground 132 to engage the ground 132 and stabilize the crane during operation. The outrigger pads 104 may be lowered and removed from the outrigger pad hoist apparatus 102 for placement between the outriggers 116 and the ground 132.

Figure 2:
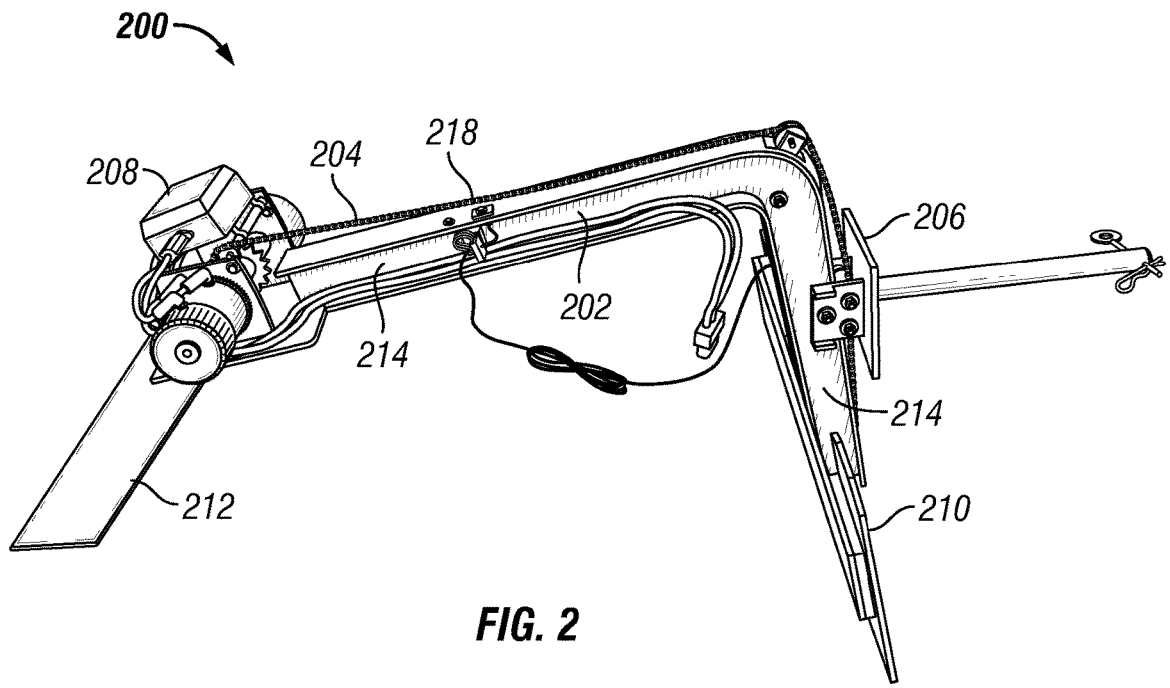
FIGS. 2 and 3 are side views of an outrigger pad hoist apparatus in accordance with an embodiment of the present disclosure.
Figure 3:
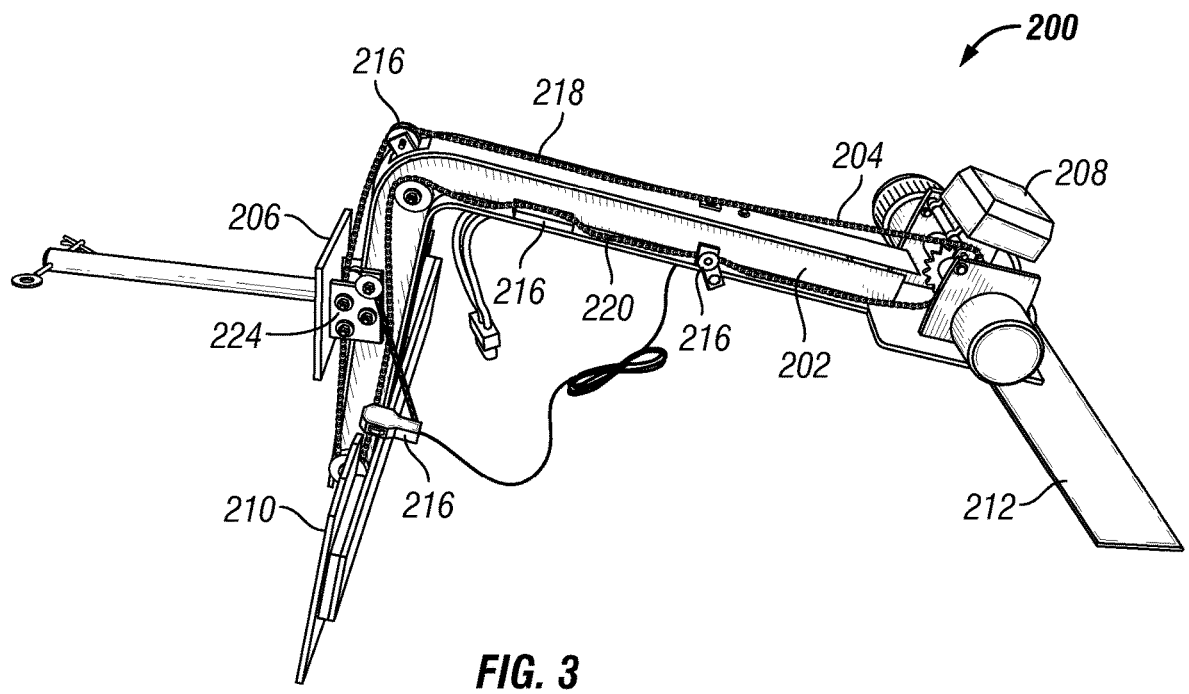

FIGS. 2 and 3 are side perspective views of an outrigger pad hoist apparatus 200 in accordance with an embodiment of the disclosure. As shown in FIGS. 2 and 3, the outrigger pad hoist apparatus 200 includes a frame 202, a chain 204 extending along the length of the frame 202, an outrigger pad holder 206, a winch mechanism 208, upper mounting plates 212, and lower mounting plates 210.

The frame 202 may include arms 214 that generally form an L-shape adapted to conform to a rear end of an elevated deck of a mobile crane. In some embodiments, the angle formed by the arms 214 of the frame may be 90°, in the range of about 80° to about 90°, or in the range of about 70° to about 80°. In some embodiments, the frame 202 may be formed from metal. In some embodiments, the frame 202 may have an I-shaped cross-sectional area. For example, the frame 202 may be formed from an I-beam. In such embodiments, a flange of the frame may act as a guide rail for movement of the outrigger pad holder 206 along the frame 202.

The frame 202 may also include chain guides 216 disposed at multiple locations along the frame 202. The chain guides 216 may include rollers, brackets, or other suitable components that route the chain 204 along the frame 202.

The chain 204 may extend along the length of the frame 202 and, with the winch mechanism 208, may move the outrigger pad holder 206 along the length of the frame 202. When operated, the winch mechanism 208 may move a first portion 218 of the chain 204 along the outward face of the frame 202 in a first direction while a second portion 220 of the chain 204 moves along a side of the frame 202 in a second direction opposite the first direction. In other embodiments, the outrigger pad hoist apparatus 200 may include a cable instead of a chain.

The winch mechanism 208 may be powered via a connection to a power source of a mobile crane. For example, the winch mechanism 208 may be connected to a source of direct current (DC) power generated from a diesel motor, a battery, or other power source. In some embodiments, the winch mechanism 208 may have a rating of at least 9,000 lbs. In some embodiments, the winch mechanism 208 may have a wired or wireless remote control that enables an operator to stop and start the winch. As will be appreciate, the rating of the winch mechanism 208 may be selected based on the type, number, and weight of outrigger pads used with the outrigger pad hoist mechanism.

As shown in FIGS. 2 and 3, the outrigger pad holder 206 may include a carrier 224 that moves along the frame 202, such that a flange of the frame 202 acts as a guide rail for the carrier 224. When the winch mechanism 208 is activated the movement of the chain 204 may also move the outrigger pad holder 206, such that the carrier 224 moves along a flange of the frame 202.

Figure 4:
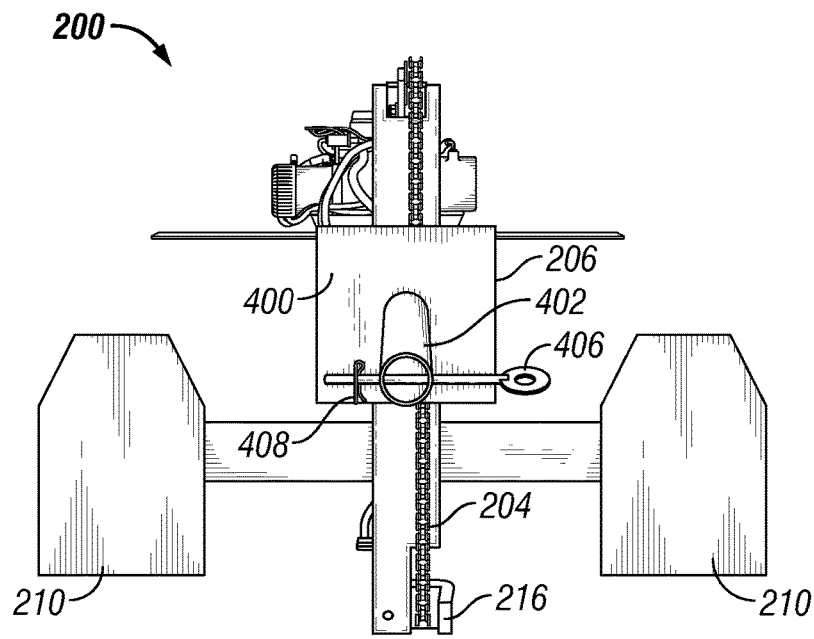
FIGS. 4 and 5 are front and rear views of an outrigger pad hoist apparatus in accordance with an embodiment of the present disclosure.
Figure 5:
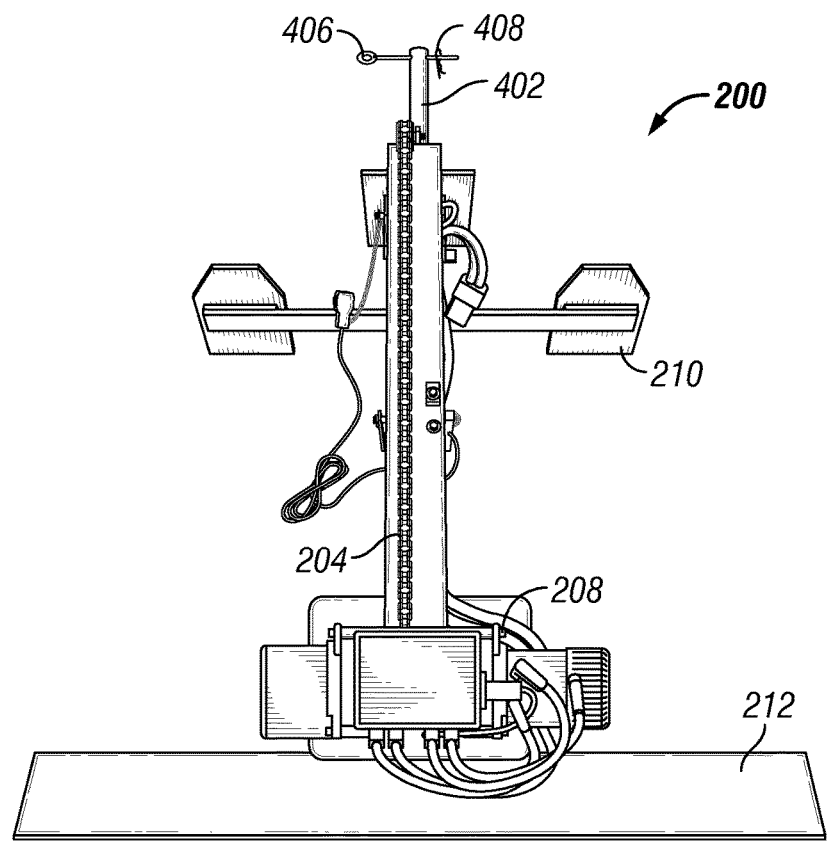

FIGS. 4 and 5 are bottom and top views of the outrigger pad hoist apparatus 200 in accordance with an embodiment of the disclosure. The outrigger pad holder 206 is shown more clearly in FIG. 4. As shown in this figure, the outrigger pad holder 206 may include a base 400 and a tube 402 extending from the base 400. The tube 402 may be of an outer diameter adapted to fit in a hole formed in an outrigger pad, such that outrigger pads may be stacked onto the base 400 by inserting the tube 402 into the holes of the outrigger pads as the pads are placed adjacent to each other. The length of the tube 402 may be selected to accommodate a minimum number of outrigger pads but not interfere with other components of a mobile crane when the outrigger pad hoist apparatus 200 is mounted to the mobile crane. In some embodiments, as also shown in FIG. 4, the tube 402 may include holes for receiving a retaining pin 406 that to assist in retaining outrigger pads stacked onto the outrigger pad holder 206. In some embodiments, the retaining pin 406 may be secured by a cotter pin 408 inserted through the retaining pin 406.

In some embodiments, the base 400, carrier 224, or both may be coupled to the chain 204 to enable movement of the outrigger pad holder 206 when the chain 204 moves via the winch mechanism 208. In some embodiments, the carrier 224 may include bearings, rollers, or other components to facilitate movement along a flange of the frame 202.

The lower mounting brackets 210 are also more clearly shown in FIG. 4. In combination with the upper mounting brackets 212, the lower mounting brackets 210 may securely couple the outrigger pad hoist apparatus 200 to a mobile crane. For example, the lower mounting brackets 210 may be coupled to a vertical surface of an elevated deck at the rear of a mobile crane. The lower mounting brackets 210 may be coupled by nails, screws, bolts, or other suitable fasteners.

As mentioned above, FIG. 5 is a lower perspective view of the outrigger pad hoist apparatus in accordance with an embodiment of the disclosure. The upper mounting brackets 212 are more clearly shown in FIG. 5. In combination with the lower mounting brackets 210, the upper mounting brackets 212 may securely couple the outrigger pad hoist apparatus to a mobile crane. For example, the upper mounting brackets 212 may be coupled to a horizontal surface (e.g., the top surface of an elected deck) at the rear of a mobile crane. The upper mounting brackets 212 may be coupled by nails, screws, bolts, or other suitable fasteners.

Figure 6:
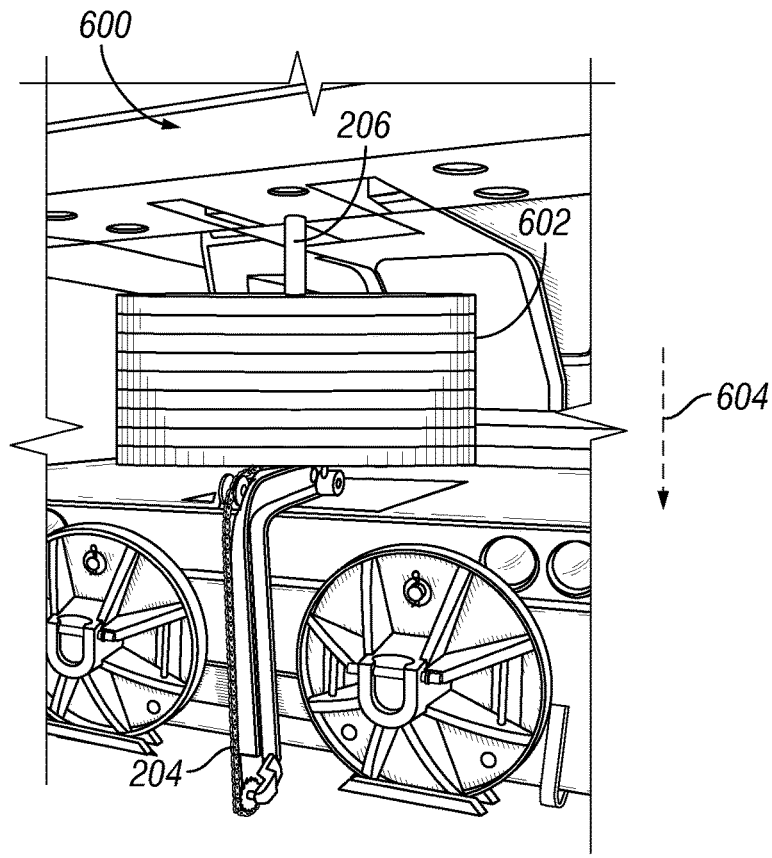
FIGS. 6 and 7 are rear views of a mobile crane depicting operation of an outrigger pad hoist apparatus coupled thereto in accordance with an embodiment of the present disclosure.
Figure 7:
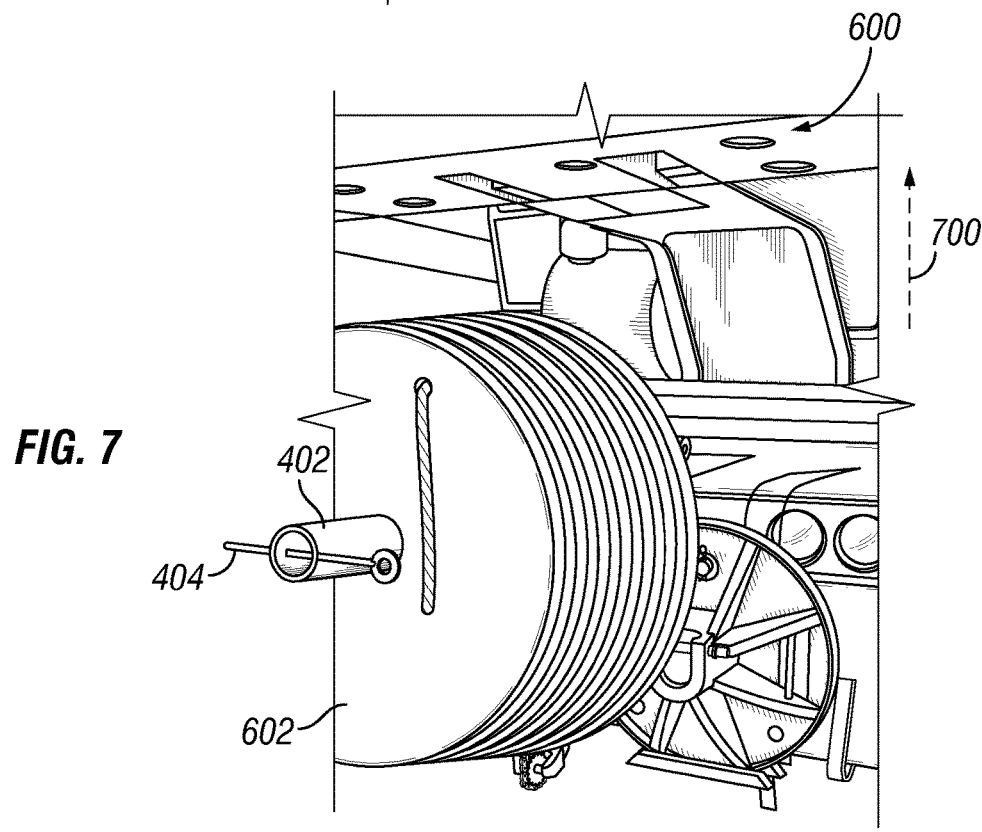

FIGS. 6 and 7 depict operation of the outrigger pad hoist apparatus 200 when coupled to a mobile crane 600 in accordance with an embodiment of the disclosure. FIGS. 6 and 7 depicts outrigger pads 602 placed on the outrigger pad holder 206 of the outrigger pad hoist apparatus 200, in accordance with the techniques described above. For example, in the embodiment shown these figures, seven outrigger pads 602 are placed on the outrigger pad holder 206, with the pin 406 inserted into the tube 402 of the outrigger pad holder 206.

As shown in FIGS. 6 and 7, the outrigger pad hoist apparatus 200 is coupled to the 600 via mobile crane 600 via the mounting plates 210 and 212. For example, the arms 214 of the frame 202 of the outrigger pad hoist apparatus 200 generally conform to the angle formed by the rear end of the elevated deck of the mobile crane 600. The frame 202 enables the outrigger pad hoist apparatus 200 to be easily and securely coupled to the mobile crane 600, such that the outrigger pad hoist apparatus 200 does not move or detach from the mobile crane 600 when the outrigger pad hoist apparatus 200 is operated.

FIG. 6 depicts the outrigger pad holder 200 and corresponding outrigger pads 602 in an upper position with respect to the mobile crane 600. In this upper position, the outrigger pads 602 may be stored atop the elevated deck of the mobile crane 600. In this position, the mobile crane 600 may be moved as vehicle while the outrigger pads 602 remain placed on the outrigger pad holder 206. Moreover, as discussed below, an operator does not need to remove the outrigger pads 602 from the upper position shown in FIG. 6 to access the pads 602.

FIG. 7 depicts the outrigger pad holder 206 and corresponding outrigger pads 602 moved to a lower position after operation of the winch mechanism 208 of the outrigger pad hoist apparatus 200. To move from the upper position shown in FIG. 6 to the lower position shown in FIG. 7, an operator may activate a control mechanism (e.g., a button, lever, or switch) of the winch mechanism 208 to activate the winch mechanism 208. The winch mechanism 208 may move the first portion of the chain 204 of the outrigger pad hoist apparatus 200 in the direction indicated by arrow 604 shown in FIG. 6 so that the outrigger pad holder 206 and corresponding outrigger pads 602 move from atop the elevated deck of the mobile crane 600 to the lower position shown in FIG. 7. In the lower position, the outrigger pad holder 206 and outrigger pads 602 are no longer atop the elevated deck of the mobile crane 600 but have moved along the frame 202 so that the outrigger pad holder 206 and outrigger pads 602 are behind a vertical surface of the elevated deck of the mobile crane 600. In this position, the outrigger pads 602 are easily accessible by an operator. For example, an operator may remove the retaining pin 406 from the tube 402 of the outrigger pad holder 206 and remove one or more of the outrigger pads 602 for use with the outriggers of the mobile crane 600. Advantageously, the operator does not need to remove the outrigger pads 602 from the greater height atop the elevated deck (as compared to the lower position shown in FIG. 7), reducing physical exertion and potential operator injury.

When the mobile crane 600 has completed operation and the outrigger pads 602 are no longer in use, the outrigger pads 602 may be placed onto the outrigger pad holder 206 when the outrigger pad holder 206 is at the lower position shown in FIG. 7. Here again, the operator does not need to lift the outrigger pads 602 up to the greater height atop the elevated deck and may place the pads 602 on the outrigger pad holder 206 at the lower position shown in FIG. 7. Moreover, in the lower position, the tube 402 of the outrigger pad holder 206 is extended generally parallel to the ground and perpendicular from a vertical surface of the rear end of the elevated deck to further ease the removal of outrigger pads 602 from the outrigger pad holder 206 and the placement of outrigger pads 602 on the outrigger pad holder 206.

After the outrigger pads 602 are placed on the outrigger pad holder 206, the retaining pin 406 may be inserted through the tube 402 and, in some instances, the cotter pin 408 inserted through the retaining pin 406. The outrigger pad holder 206 and outrigger pads 602 may be moved (i.e., "hoisted") to the upper position shown in FIG. 6 by activation of the winch mechanism 208 in the opposite direction from that used to the move the outrigger pad holder 206 and outrigger pads 602 to the lower position. To move from the lower position shown in FIG. 7 to the upper position shown in FIG. 6, an operator may activate a control mechanism (e.g., a button, lever, or switch) of the winch mechanism 208 to activate the winch mechanism 208. The winch mechanism 208 may move the first portion of the chain 204 of the outrigger pad hoist apparatus 200 in the direction indicated by arrow 700 shown in FIG. 7 so that the outrigger pad holder 206 and corresponding outrigger pads 602 move from the lower position shown in FIG. 7 to the upper position shown in FIG. 6 (i.e., atop the elevated deck of the mobile crane 600). In this position, the outrigger pads 602 may be stored while the mobile crane is operated as a vehicle.

As will be appreciated, the outrigger pad hoist apparatus may be particularly advantageous when used with relatively smaller mobile cranes capable of being operated by a single operator. In such embodiments, the outrigger pad hoist apparatus may easily enable a single operator to remove outrigger pads from and place outrigger pads on a mobile cranes while reducing physical exertion and risk of injury. Moreover, it should be appreciated that the other embodiments of the outrigger pad hoist apparatus may be used with other machines and vehicles such as semi-trailer trucks.

In some embodiments, the outrigger pad hoist apparatus may be retrofit to existing mobile cranes. The outrigger pad hoist apparatus may replace existing outrigger pad holders. For example, the outrigger pad hoist apparatus may be coupled to the elevated deck and rear bumper of existing mobile cranes to add the outrigger pad hoist functionality to existing mobile cranes.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method comprising:
    operating an outrigger pad hoist apparatus to move a plurality of outrigger pads from a first position to second position, the first position located atop a horizontal surface of an elevated deck of a mobile crane and the second position located behind a vertical surface of the elevated deck of the mobile crane, the outrigger pad hoist apparatus comprising:
        a frame comprising a first arm and a second arm, the first arm and second arm forming an angle in the range of 80° to 90°, the frame coupled to the elevated deck of the mobile crane;
        a winch mechanism coupled to the frame;
        a chain extending along the frame such that a first portion of the chain is moved via the winch mechanism in a first direction and a second portion of the chain is moved via the winch mechanism in a second direction opposite the first direction; and
    an outrigger pad holder coupled to the chain and moveable along the frame between the first position and the second position via movement of the chain, the outrigger pad holder configured to receive the plurality of outrigger pads, wherein the outrigger pad holder comprises a tube extending from a base, the tube configured to insert through a respective plurality of holes formed in the plurality of outrigger pads.

2. The method of claim 1, comprising removing one of the plurality of outrigger pads from the outrigger pad holder when the plurality of outrigger pads are in the second position.

3. A method comprising:
    operating an outrigger pad hoist apparatus to move a plurality of outrigger pads from a first position to second position, the first position located atop a horizontal surface of an elevated deck of a mobile crane and the second position located behind a vertical surface of the elevated deck of the mobile crane, the outrigger pad hoist apparatus comprising:
        a frame comprising a first arm and a second arm, the first arm and second arm forming an angle in the range of 80° to 90°, the frame coupled to the elevated deck of the mobile crane;
        a winch mechanism coupled to the frame;
        a chain extending along the frame such that a first portion of the chain is moved via the winch mechanism in a first direction and a second portion of the chain is moved via the winch mechanism in a second direction opposite the first direction; and
    an outrigger pad holder coupled to the chain and moveable along the frame between the first position and the second position via movement of the chain, the outrigger pad holder configured to receive the plurality of outrigger pads, wherein the frame comprises an I-shaped cross-section having a first flange and a second flange, and the outrigger pad holder comprises a carrier engaging the first flange.

4. A method comprising:
    operating an outrigger pad hoist apparatus to move a plurality of outrigger pads from a first position to second position, the first position located atop a horizontal surface of an elevated deck of a mobile crane and the second position located behind a vertical surface of the elevated deck of the mobile crane, the outrigger pad hoist apparatus comprising:
        a frame comprising a first arm and a second arm, the first arm and second arm forming an angle in the range of 80° to 90°, the frame coupled to the elevated deck of the mobile crane;
        a winch mechanism coupled to the frame;
        a chain extending along the frame such that a first portion of the chain is moved via the winch mechanism in a first direction and a second portion of the chain is moved via the winch mechanism in a second direction opposite the first direction; and
    an outrigger pad holder coupled to the chain and moveable along the frame between the first position and the second position via movement of the chain, the outrigger pad holder configured to receive the plurality of outrigger pads, wherein the frame comprises a first plate configured to couple to a horizontal surface of the elevated deck of the mobile crane and a second plate configured to couple to a vertical surface of the elevated deck of the mobile crane.

* * * * *